United States Patent [19]

Belisle et al.

[11] Patent Number: 4,721,649
[45] Date of Patent: Jan. 26, 1988

[54] RETROREFLECTIVE SHEETING

[75] Inventors: Louis C. Belisle; Thomas R. Borden, both of Oakdale; Raymond E. Grunzinger, Jr., New Scandia Township, Washington County, all of Minn.

[73] Assignee: Minnesota Mining and Manufacturing Company, St. Paul, Minn.

[21] Appl. No.: 59,003

[22] Filed: Jun. 8, 1987

Related U.S. Application Data

[60] Division of Ser. No. 732,346, May 8, 1985, which is a continuation of Ser. No. 414,547, Sep. 2, 1982, abandoned.

[51] Int. Cl.⁴ .............................................. G02B 5/12
[52] U.S. Cl. ................................ 428/325; 156/276; 156/285; 427/137; 427/193; 427/203; 427/204; 428/327; 428/425.6; 428/913
[58] Field of Search ............... 427/137, 193, 203, 204; 156/276, 285; 428/325, 327, 425.6, 913

[56] References Cited

U.S. PATENT DOCUMENTS

| Re. 28,274 | 12/1974 | Altman | 353/44 |
|---|---|---|---|
| 2,294,930 | 9/1942 | Palmquist | 88/82 |
| 2,326,634 | 8/1943 | Gebhard et al. | 88/82 |
| 2,379,741 | 7/1945 | Palmquist | 88/82 |
| 2,407,680 | 9/1946 | Palmquist et al. | 88/82 |
| 2,543,800 | 3/1951 | Palmquist et al. | 88/82 |
| 2,963,378 | 12/1960 | Palmquist et al. | 106/193 |
| 3,005,382 | 10/1961 | Weber | 88/82 |
| 3,190,178 | 6/1965 | McKenzie | 88/82 |
| 3,222,204 | 12/1965 | Weber et al. | 117/27 |
| 3,269,839 | 8/1966 | Altman | 96/75 |
| 3,382,908 | 5/1968 | Palmquist et al. | 152/353 |
| 3,388,027 | 6/1968 | Altman | 161/4 |
| 3,413,058 | 11/1968 | Chi Fang Tung et al. | 350/105 |
| 3,488,302 | 1/1970 | Pyron | 260/9 |
| 3,551,025 | 12/1970 | Bingham et al. | 350/105 |
| 3,568,126 | 9/1971 | Keeley | 154/123 |
| 3,700,305 | 10/1972 | Bingham | 350/105 |
| 3,700,478 | 10/1972 | Bingham | 117/28 |
| 3,758,192 | 9/1973 | Bingham | 350/105 |
| 3,795,435 | 3/1974 | Schwab | 350/105 |
| 3,801,183 | 4/1974 | Sevelin et al. | 350/105 |
| 3,874,784 | 4/1975 | Eigenmann | 350/109 |
| 3,877,786 | 4/1975 | Booras et al. | 350/105 |
| 3,889,027 | 6/1975 | White | 428/34 |
| 3,919,031 | 11/1975 | White | 156/219 |
| 3,971,692 | 7/1976 | Anderson | 156/241 |
| 3,994,086 | 11/1976 | Mizuochi | 40/135 |
| 4,075,049 | 2/1978 | Wood | 156/220 |
| 4,082,426 | 4/1978 | Brown | 350/105 |
| 4,102,562 | 7/1978 | Harper et al. | 350/105 |
| 4,104,102 | 8/1978 | Eagon et al. | 156/298 |
| 4,226,658 | 10/1980 | Carlson et al. | 156/247 |
| 4,235,512 | 11/1980 | Brasfield et al. | 350/105 |
| 4,367,920 | 1/1983 | Tung et al. | 350/105 |

*Primary Examiner*—Marion C. McCamish
*Attorney, Agent, or Firm*—Donald M. Sell; James A. Smith; Jennie G. Boeder

[57] ABSTRACT

A retroreflective sheeting utilizing a particular polymer as the bead bond layer is disclosed. The polymeric bead bond comprises urethane and urea linkages, and has a stage prior to thermosetting in which it may be softened by the application of heat and in which it has a relatively nontacky character. The retroreflective sheeting disclosed possesses the unique combination of high reflectance and superior exterior durability.

4 Claims, 1 Drawing Figure

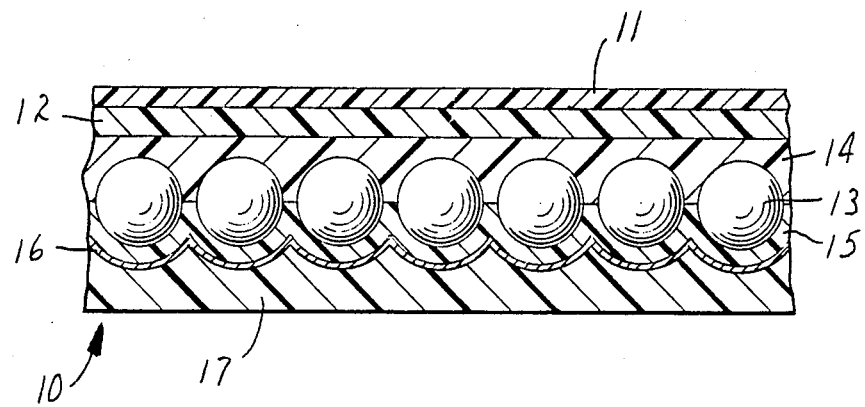

RETROREFLECTIVE SHEETING

This is a division of application Ser. No. 732,346, pending, filed May 8, 1985, which is a continuation of application Ser. No. 414,547, filed Sept. 2, 1982, now abandoned.

FIELD OF THE INVENTION

This invention relates to highly reflective, highly durable, retroreflective sheeting constructions comprising a monolayer of reflecting transparent spheres partially embedded in a thermoset polymeric binder. This invention particularly relates to the manufacture of retroreflective sheeting utilizing a bead bond layer which before thermal curing comprises a homogeneous isocyanate-functional polymeric coating composition which may be softened by the application of heat and which has a relatively nontacky character in the softened state.

BACKGROUND OF THE INVENTION

Heretofore, a number of retroreflective sheeting products have been marketed. A typical example is characterized by a single layer of tiny transparent microspheres embedded in a thermoset polymeric bead bond layer which is backed by a specularly reflective layer and an adhesive with a strippable protective layer, and surfaced with a transparent thermoset topcoat. Such sheeting is known as "embedded-lens" sheeting and was first taught by Palmquist et al., U.S. Pat. No. 2,407,680. Such sheeting has been sold commercially for many years in large volume and to the general satisfaction of its users. Despite this general satisfaction, there has been a desire for an improvement in certain properties of the sheeting. For example, it is desired to produce retroreflective sheeting which has greater durability and greater ability to withstand weathering than retroreflective sheeting heretofore known in the art. It is further desired to provide retroreflective sheeting which has improved reflectivity.

The retroreflective sheeting of the present invention, has improved physical and chemical properties over the retroreflective sheeting of the prior art. The improved retroreflective properties of the sheeting are believed to be due to the particular polymeric bead bond layer which in its uncured state may be softened by the application of heat and has a relatively nontacky character in the softened condition. This bead bond composition is thermally set after the application of glass beads to form a substantially infusible and insoluble crosslinked bead bond layer comprising urethane and/or urea linkages.

The retroreflective sheeting of the present invention is capable of carrying a greater concentration of transparent microspheres than most of the prior art sheeting, and consequently has greater retroreflectivity than most prior art sheetings. The higher concentration of microspheres is due to the nontacky thermoplastic character of the uncured softened polymeric bead bond layer, which allows for repositioning of the microspheres so that more beads may be forced into a unit area.

The bead bond materials generally known in the art are tacky in their soft or cured state. When exposed to a mass of glass beads or microspheres, these materials have a tendency to pick up the beads in multiple layers rather than a monolayer and, because of their tacky nature, do not allow for repositioning of the beads to maximize the number of beads per unit area. For example, U.S. Pat. No. 3,795,435 describes a retro-reflective sheeting which employs a bead bond layer prepared from a two-part polyurethane. The patent states that this bead bond layer has an adhesive character. Thus, it would not be able to carry transparent microspheres in as high a concentration as the retroreflective sheeting of to the present invention.

Additionally, the thermally cured polymeric bead bond layers of this invention, particularly those utilizing low molecular weight crystalline polyols as crosslinking agents, possess superior physical properties including impact resistant, low temperature flexibility and high temperature stability, superior elongation properties, external durability, and resistance to yellowing. Exterior durability and resistance to yellowing upon exposure to exterior environments are essential to the performance of retroreflective sheeting, particularly when used in exterior applications. Crystalline polyols have heretofore not been useful in preparing cured polymers which contain urethane or urea linkages since they are substantially insoluble in aprotic solvents, which are necessary solvent systems for the manufacture of such polymers. However, the method of copending U.S. patent application, U.S. Ser. No. 333,810, overcomes the problem of the limited solubility of crystalline polyol crosslinkers in aprotic solvents and allows these crosslinkers to be used in the synthesis of cured bead bond layers comprising urethane and/or urea linkages.

SUMMARY OF THE INVENTION

The present invention provides a retroreflective sheeting comprising a monolayer of transparent microspheres partially embedded in a polymeric layer which has been reacted to a substantially infusible and insoluble state, said polymeric layer comprising urethane or urea linkages, and said polymeric layer having a stage prior to said reaction in which it may be softened by the application of heat, and in which it has a relatively nontacky character. By relatively nontacky, it is meant that the tack of the polymeric layer is greater than about 200 centimeters when measured according to the "Tack Rolling Ball Method," PSTC-6, by the Pressure-Sensitive Tape Council, at 23° C. and 50 percent relative humidity. The "Tack Rolling Ball Method", which is incorporated herein by reference, is a method of determining the tack or adhesive properties of low adhesive pressure sensitive compositions. The composition to be tested is coated on a tape and heated at about 100° C. until dry. The tape is placed adhesive side up in line with an inclined raceway. A clean ball bearing is released at the top of the incline and is allowed to roll to a stop on the adhesive. The distance is measured from the center of contact between the ball and adhesive to the near end of the incline. The average of five measurements of the stopping distance is reported as the tack value.

While as mentioned above, the polymeric layer in its uncured softened state should exhibit a rolling ball distance of greater than about 200 cm, it is preferred, for maximum bead packing, that it exhibit a rolling ball distance of greater than about 600 cm, when measured according to the "Tack Rolling Ball Method," at 23° C. and 50 percent relative humidity.

Applicants have found that due to the nontacky character of the uncured polymeric bead bonding layer, in sheeting of the invention microspheres may be introduced into the sheeting in a concentration of at least about 80 percent, and preferably at least about 90 percent of the theoretical maximum. The greater concentration of microspheres in sheeting of this invention means that a higher percentage of incident light is focused onto the specularly reflective layer and is thereby reflected back toward the original source of the light. Whereas the most common commercial varieties of embedded lens sheeting have exhibited typical retroreflective brightness on the order of 8–130 candella per square meter of sheeting per lux of incident light (or candle power per square foot per lumen), sheetings of the invention are routinely capable of about 150 or more, and preferably at least about 200 candella per square meter per lux of incident light; these measurements are made under the standard conditions of illuminating the sheeting at an incidence angle of 5° and measuring retroreflectivity at a divergence angle of 0.2°.

Additionally, as discussed hereinabove, retroreflective sheeting utilizing the particular polymeric bead bond composition, offers superior chemical and physical properties. The thermally cured polymeric bead bond layer can be formulated to have all of the following properties: high impact resistance; low temperature flexibility, i.e., a glass transition temperature ($T_g$) of less than 150° C., and preferably less than 0° C., with high temperature stability, i.e., at temperatures greater than 100° C. and preferably at temperatures greater than 150° C.; tensile strengths greater than 150 kg/cm$^2$, and preferably greater than 200 kg/cm$^2$; superior elongation properties, i.e., greater than 100% elongation and preferably greater than 150% elongation; solvent resistance to even such harsh solvents as tetrahydrofuran and methylene chloride; resistance to degradation and abrasion upon exposure to exterior environments; and optical clarity with a resistance to yellowing upon exposure to exterior environments.

Furthermore, the polymeric bead bond compositions of this invention can comprise up to 100 percent solids. Thus, these compositions are useful where it is desired to keep the level of hydrocarbon emissions at a minimum to meet pollution standards. Additionally this factor becomes increasingly important as the cost of solvents increases.

DESCRIPTION OF THE DRAWING

The FIGURE is an enlarged sectional view through an embedded-lens type reflective sheeting made according to the present invention.

DETAILED DESCRIPTION

The FIGURE illustrates an embedded-lens retroreflective sheeting utilizing the particular polymeric bead bond layer 14. The structure of the sheet 10 includes a transparent hard coat 11 which forms the exterior front surface of the sheeting; a transparent topcoat 12; a monolayer of transparent microsphere lenses 13, typically glass beads, embedded in a thermoset bead bond layer 14; spacing layer 15 applied to the back surfaces of the microsphere lenses 13 in such a way as to follow the curved surface of the back of the microspheres; a specularly reflective layer 16 vapor-deposited on the spacing layer 15; and a layer of adhesive 17 covering the reflective layer 16.

Light rays incident on the sheeting travel through the layers 11, 12 and 14 to the microspheres 13, which act as lenses focusing the incident light approximately onto the appropriately spaced specularly reflective layer 16. Thereupon the light rays are reflected back out of the sheeting along substantially the same path as they traveled to the sheeting.

Except for the particular bead bond layer 14, the structure shown in the FIGURE is conventional, and methods for its formation are well known in the art.

Transparent Hard Coat

The transparent hard coat 11 is optional and is an abrasion resistant, clear polymer coating which provides a hard, weatherproof exterior to the retroreflective sheet. The hard coat 11 can be made of any suitable transparent polymer-based material such as methyl methacrylate resin, acrylic resin, alkyd resin, polyurethane resin, epoxy resin, polyester resin, polycarbonate resin, polyvinyl butyral, cellulose acetatebutyrate, and the like. These resins may be applied from solution or dispersion or from liquids that contain no volatiles. The materials may be nonreactive or may react to a crosslinked relatively insoluble and infusible state. Preferably transparent hard coat 11 is between about 0.002 and 0.03 mm thick.

Transparent Top Coat

Transparent topcoat 12 also provides an abrasion resistant, weatherproof protective covering for the underlying reflective beads. Topcoat 12 is preferably the same polymer which forms the bead bond layer 14, described in more detail hereinbelow. Alternatively other transparent polymer-based materials such as aminoplast crosslinked and polyisocyanate crosslinked polyesters, acrylic polymers, and acrylic copolymers, and plasticized polyvinyl chloride polymers and copolymers can be successfully employed as topcoat 12. Preferably topcoat 12 is between about 0.02 mm and 0.065 mm thick.

Polymeric Bead Bond Layer

Bead bond layer 14 contributes critically to the illustrated retroreflective sheeting, in that it is the unique characteristics of this layer which enable the sheeting to possess improved reflecitivity. Bead bond layer 14 is a polymeric layer comprised of urea and/or urethane linkages, which has been reacted or thermally set to a substantially infusible and insoluble state. Preferably, bead bond layer 14 is prepared by thermally setting a homogeneous coating composition comprising (a) a polymeric compound which has isocyanate groups incorporated therein, a substantial portion of the free isocyanate groups being blocked, masked or joined to substituents that can be removed by heating; and (b) a crosslinking agent for the isocyanate groups, or a catalyst which provides the isocyanate groups with the ability to crosslink with other isocyanate groups when heated.

A preferred method of preparing the uncured homogeneous bead bond composition comprises the steps of (a) providing an isocyanate-functional polymeric compound, which is either isocyanate terminated, or has isocyanate groups incorporated therein, wherein a substantial portion of the isocyanate groups are either blocked, masked, or joined to substituents or agents that can be removed by heating;

(b) adding a crosslinking agent, preferably a crystalline polyol crosslinking agent, to the masked isocyanate-functional polymeric compound and allowing this mixture to react at an elevated temperature for a period of time which is sufficient to drive off no more than about one-third of the substituents which can be removed by heating, in order to partially react the crosslinking agent and the isocyanate-functional polymer; and (c) maintaining the reaction at the elevated temperature until a homogeneous coating composition results.

The resultant homogeneous coating composition may be cooled to room temperature and stored, or may be used immediately in the manner described hereinbelow.

The isocyanate-functional polymeric starting compound

Preferably the isocyanate-functional polymeric starting compound referred to in step (a) above is an isocyanate-terminated polyurethane compound. Commercially available isocyanate-terminated polyurethane compounds include polymers of polyoxytetramethylene glycol and toluene diisocyanate, available as Adiprene® L-100 from E. I. du Pont De Nemours and Company, Inc., and polymers of polyoxytetramethylene glycol and methylene-bis-(4-cyclohexylisocyanate), available as Adiprene® LW-520 from E. I. du Pont De Nemours and Company, Inc. Alternatively, the isocyanate-terminated polyurethane may be prepared by methods well-known in the art. For example, U.S. Pat. Nos. 4,211,804; 3,933,725; and E. N. Doyle in "The Development and Use of Polyurethane Products," McGraw-Hill, Inc. (1971), at pages 93–124, describe procedures for the preparation of isocyanate-terminated polyurethanes.

Generally, the preparation of polyurethanes involves the reaction of a polyol, polyether polyol, hydroxyl-terminated polyester, acrylic polyol, polyester amide, or other polyfunctional active hydrogen compound with a diisocyanate or other polyisocyanate, preferably using an excess of the polyisocyanate. An extensive description of some of the useful techniques for preparing polyurethanes can be found in J. H. Saunders and K. C. Frisch, "Polyurethanes: Chemistry and Technology," Part II, Interscience (New York 1964), especially on pages 8 to 49, and in the various references cited therein.

Polyols useful in preparing isocyanate terminated polyurethane compound are diols, triols, and combinations thereof. Such polyols include those disclosed in U.S. Pat. Nos. 3,583,943; 3,846,378; 4,046,744; and 3,248,371. Other useful polyols are taught by E. N. Doyle in "The Development and Use of Polyurethane Products," McGraw-Hill, 1971. Preferred polyols include hydroxy terminated linear polyols prepared from oxiranes and lactones. These preferred polyols are exemplified by polyoxyethylene diols, polyoxypropylene diols and 2-oxepanone polymers of 2,2'-oxybisethanol known as polycaprolactone diols.

Useful polyisocyanates are those commonly employed in polyurethane synthesis, among these being aliphatic and cycloaliphatic diisocyanates such as hexamethylene diisocyanate, trimethylhexamethylene diisocyanate, isophorone diisocyanate, 4,4'-methylenedicyclohexyl diisocyanate, and the like; aromatic diisocyanates such as toluene diisocyanates and 4,4'-methylenediphenyl diisocyanate; and higher polyisocyanates such as a triisocyanate, for example, the buiret of 1,6-hexamethylene diisocyanate, commercially available as Desmodur® N from Mobay Chemical Company. Other polyisocyanates which are useful for forming the isocyanate-terminated polymer are disclosed in U.S. Pat. Nos. 3,846,378; 3,621,000; 3,926,875; 3,993,849; 4,046,744; and 3,694,389. Still other useful polyisocyanates are taught by Doyle in "The Development and Use of Polyurethane Products," supra.

It has been found that in order to produce cured polyurethane bead bond layers which have optimal low-temperature flexibility, exterior durability, and a reduced tendency to yellow, it is preferred to use linear diols and aliphatic diisocyanates to prepare the isocyanate-terminated polyurethane polymer. A particularly preferred linear diol is polycaprolactone having a formula weight of between about 500 and 2,000, preferably between 500 and 1,000. Particularly preferred aliphatic diisocyanates include 4,4'-methylene-dicyclohexyl diisocyanate, cyclohexane-1,4-diisocyanate, hexamethylene-1,6-diisocyanate, isophorone diisocyanate, trimethyl hexamethylene diisocyanate, methyl cyclohexyl diisocyante, and tetramethylene-1,4-diisocyanate.

The equivalent ratio of polyisocyanate to polyol may vary between a slight excess of polyisocyanate to a large excess of polyisocyanate, i.e. from an equivalent ratio of about 1.01:1.00 NC/OH, to an equivalent ratio of about 4.00:1.00 NCO/OH. Preferably the equivalent ratio of NCO/OH is 2:1.

Additionally, it is preferred that a typical urethane synthesis catalyst be used to prepare the isocyanate-terminated polyurethane polymer. Exemplary catalysts are disclosed by Doyle in "The Development and Use of Polyurethane Products," supra. Preferred catalysts are those which do not promote trimerization of the diisocyanate such as tin, zinc, manganese, cobalt and zirconium compounds. Tertiary amines may also be used if they meet the nontrimerization requirement. Metal catalysts of tin and zinc are particularly preferred, with a combination of zinc and particularly preferred, with a combination of zinc 2-ethylhexoate and dibutyl tin dilaurate being most preferred.

It is preferred that the urethane synthesis catalyst be present in a range from about 0.01 percent to 2.0 percent by weight based on the solids content of the formulations, with the concentration of 0.05 percent by weight being more preferred. For optimum physical strength of the cured polyurethane films it is most preferred to use a catalyst which is a combination of 0.05 percent by weight tin and 0.15 percent by weight zinc.

If desired, a solvent which is inert to the reaction, such as benzene, toluene, xylene or similar unreactive hydrocarbons may be present in the reaction mixture in a concentration of up to about 50 parts by weight of solids. The inclusion of a nonreactive solvent is, of course, not desired where a composition having 100 percent solids is to be prepared. If a solvent is used it should be sufficiently low boiling so that it will vaporize when coated onto a surface in a thin film. Preferred solvents include 2-ethoxyethyl acetate, 2-(2-ethoxy)ethoxyethyl acetate, 2-butoxyethyl acetate, toluene, xylene, ethyl acetate, butyl acetate, amyl acetate, other similar esters, ketones, chlorinated solvents, nitroaliphatic solvents, dioxane, and the like.

In addition, to isocyanate-terminated polyurethane compounds, other isocyanate-functional polymers, such as isocyanate-functional acrylics, may be utilized as the polymeric starting compound. The preparation of isocyanate-functional acrylics is well-known in the art, and is described in U.S. Pat. Nos. 4,301,257; 4,291,632; 3,929,744; and in the *Journal of Applied Polymer Science,* Vol. 20, pages 3305–3311 (1976), all of which are incorporated herein by reference. Furthermore, polymers which can, by known reaction techniques, be converted to isocyanate-functional polymers are also usefully employed as the polymeric starting compound. For example, amine-functional polymers can be converted into isocyanate-functional polymers by the methods described in the *Encyclopedia of Chemical Technology*, John Wiley and Sons, New York, New York, (1981), Vol. 13, at pages 799–807, incorporated herein by reference.

The masking or blocking agent

A substantial portion of the isocyanate functionalities of the polymeric starting compound are either blocked, masked or joined to groups or moieties that can be removed by heating. By "a substantial portion" it is meant that more than about 70 percent, preferably more than 99 percent, and most preferably more than 99.9 percent of the isocyanate functionalities are blocked or masked.

Isocyanate blocking agents are well known in the art. For instance, there can be used known blocking agents of the phenol type, lactam type, active methylene type, alcohol type, mercaptan type, acid amide type, imide type, amine type, imidazole type, urea type, carbonate type, imine type, oxime type and sulfite type. Blocking agents of the phenol type, oxime type, lactam type and active methylene type are used especially advantageously.

Specific examples of blocking agents which may be utilized in the practice of this invention are as follows:
(a) Phenol type blocking agents:
Phenol, cresol, xylenol, nitrophenol, chlorophenol, ethylphenol, t-butylphenol, hydroxybenzoic acid, hydroxybenzoic acid esters, 2,5-di-tert-butyl-4-hydroxytoluene, etc.
(b) Lactam type blocking agents:
ε-Caprolactam, δ-valerolactam, γ-butyrolactam, β-propiolactam, etc.
(c) Active methylene type blocking agents:
Diethyl malonate, dimethyl malonate, ethyl acetoacetate, methyl acetoacetate, acetylacetone, t-butylacetoacetate, etc.
(d) Alcohol type blocking agents:
Methanol, ethanol, n-propyl alcohol, isopropyl alcohol, n-butyl alcohol, isobutyl alcohol, t-butyl alcohol, n-amyl alcohol, t-amyl alcohol, lauryl alcohol, ethylene glycol monomethyl ether, ethylene glycol monoethyl ethyl, ethylene glycol monobutyl ether, diethylene glycol monomethyl ether, diethylene glycol monoethyl ether, propylene glycolmono methyl ether, methoxymethanol, glycolic acid, glycolic acid esters, lactic acid, lactic acid esters, methylol urea, methylol melamine, diacetone alcohol, ethylene chlorohydrin, ethylene bromohydrin, 1,3-dichloro- 2-propanol, ω-hydroperfluoro-alcohol, acetocyanohydrin, etc.
(e) Mercaptan type blocking agents:
Butylmercapton, hexylmercaptan, t-butylmercaptan, t-dodecylmercaptan, 2-mercaptobenzothiazole, thiophenol, methylthiophenol, ethylthiophenol, etc.
(f) Acid amide type blocking groups:
Acetoanilide, acetoanisidide, acetotoluide, acrylamide, methacrylamide, acetamide, stearylamide, benzamide, etc.
(g) Imide type blocking agents:
Succinimide, phthalimide, maleimide, etc.
(h) Amine type blocking agents:
Diphenyl amine, phenylnaphthyl amine, xylidine, N-phenylxylidine, carbazole, aniline, naphthyl amine, butyl amine, dibutyl amine, butylphenyl amine, etc.
(i) Imidazole type blocking agents:
Imidazole, 2-ethylimidazole, etc.
(j) Urea type blocking agents:
Urea, thiourea, ethylene urea, ethylene thiourea, 1,3-diphenylurea, etc.
(k) Carbamate type blocking agents:
Phenyl N-phenylcarbamate, 2-oxazolidone, etc.
(l) Imine type blocking agents:
Ethyleneimide, etc.
(m) Oxime type blocking agents:
Formaldoxime, acetaldoxime, acetoxime, methylethylketoxime, diactyl monoxime, benzophenone oxime, cyclohexanone oxime, etc.
(n) Sulfite type blocking agents:
Sodium bisulfite, potassium bisulfite, etc.

Additional isocyanate blocking agents are taught by Doyle in "The Development and Use of Polyurethane Products," supra.

Preferred blocking agents for making tough, durable bead bond layers are oximes or active methylene type blocking agents. The most prefered blocking agents are 2-butanoxime, also commonly known as methyl ethyl ketoxime, ethyl acetoacetate, and t-butylacetoacetate.

The equivalent ratio of blocking agent to isocyanate equivalent present in the isocyante-functional polymer is preferably between about 0.7 to 1.5, and most preferably between 1.0 to 1.1. If the blocking agent is not present in a concentration of more than about 0.7 equivalents blocking agent to isocyante equivalent, gellation will prematurely occur upon mixing the polymer with the crosslinker.

Generally the blocked isocyante-functional polymer is prepared by mixing the blocking group and the isocyanate-functional polymer as is described by Saunders and Frisch in "Polyurethanes: Chemistry and Technology," supra, or by Doyle in "The Development and Use of Polyurethane Products," supra, incorporated herein by reference. Additional references which describe the manufacture of blocked isocyanate polymers include U.S. Pat. Nos. 4,242,248; 4,280,944; and 3,830,785, all of which are incorporated herein by reference. If desired, a solvent which is inert to the reaction, such as benzene, toluene, xylene or similar unreactive hydrocarbons may be utilized. Alternatively, commercially available blocked isocyante polymers such as Adiprene ® B-16, available from E. I. du Pont De Nemours and Co., may be employed.

As an alternative to employing well-known blocking agents to block the isocyanate functionality of the polymer, polymeric materials may be utilized which inherently contain masked isocyanate functionalities, which can be unmasked by heating. For example, cyclic nitrile adducts containing two or more cyclic nitrile-functional groups enter into a ring-opening addition reaction in the presence of heat and crosslinking agents to result in cured polymers containing urethane and/or urea linkages. The preparation of cyclic nitrile adducts is described in U.S. Pat. Nos. 3,531,425; 3,652,507; 3,702,320; and 4,049,007, all of which are incorporated herein by reference.

The crosslinking agent

In step (c) of the above-described preferred method of preparing the uncured bead bond composition, a crosslinking agent and the blocked or masked isocyanate-functional polymer are allowed to partially react at an elevated temperature which is sufficient to unblock or unmask no more than one-third of the isocyanate functionalities. The elevated temperature at which the reaction is allowed to occur is preferably about the minimum dissociation temperature for the particular blocking or masking agent. The minimum dissociation temperature is the temperature at which greater than about 0.1 percent of the isocyanate groups of the polymeric compound are unblocked or unmasked. This temperature for any particular masking agent can be found by determining the temperature at which an isocyanate group absorption appears in the infrared spectrum of a polymeric compound which has substantially all, i.e., more than about 99.9 percent, of its free isocyanate groups masked by the particular masking group. Generally the minimum dissociation temperature will be between about 90° and 260° C. While temperatures higher than the minimum dissociation temperature may be used, at higher temperatures the reaction is more difficult to control and may result in premature gellation of the polymer.

Preferred crosslinking agents are crystalline polyols having three or more active hydrogen groups. As mentioned previously, crystalline polyols have heretofore not been useful in preparing polymers which contain urethane or urea linkages since they are substantially insoluble in aprotic solvents, which are necessary solvent systems for such polymers. However, the method described hereinbelow and in copending U.S. patent application, U.S. Ser. No. 333,810, (incorporated herein by reference) overcomes the problem of the limited solubility of crystalline polyol crosslinkers in aprotic solvents and allows these crosslinkers to be used in the synthesis of bead bond layers useful in the invention. This is believed to be due to the fact that the reaction of the partially unmasked isocyanate-functional polymer and the crosslinking agent creates an oligomer comprising the unmasked polymer with partial crosslinker functionality. This oligomer acts as an effective solubilizing agent for the balance of the crosslinking agent, and allows a homogeneous coating composition comprising a crystalline polyol to be produced.

The crystalline polyol crosslinking may possess amine, carboxylic, or mercapto functionalities or any combination thereof, such that the total number of active hydrogen groups per molecule is greater than or equal to 3.

Particularly preferred crosslinking agents are low molecular weight, i.e., less than about 500, crystalline polyols because they provide cured coatings having the most desirable physical properties. In particular, cured coatings crosslinked by tris(2-hydroxyethyl)isocyanate, pentaerythritol, trimethylol propane and trimethylol ethane are more resistant to yellowing when exposed to external environments, are more durable and are more extensible than any of the crosslinked polymeric urethane or urea coatings known in the prior art.

Other useful low molecular weight crystalline polyols include isocyanurates such as tris(hydroxy methyl)isocyanurate, tris(2-hydroxy-3-chloropropyl)isocyanurate, and tris(2-hydroxy propyl)isocyanurate. Additionally useful low molecular weight polyols are triols produced by the substitution of lower alkyl ($C_1$-$C_8$) groups on the second carbon atom of glycerol. Such triols include trimethylolethane, etc.

While they are not particularly preferred, higher molecular weight, i.e., above 500, crystalline polyols are useful crosslinking agents. Useful higher molcular weight crosslinking agents are triols produced through the addition condensation of lactones and oxiranes to glycerol or isocyanurate triols. Included among these triols are polycaprolactone polyols, and polyoxyethylene or polyoxypropylene derivatives of hydroxyalkyl isocyanurates.

The reaction of the insoluble crosslinking agent and the blocked isocyanate-functional polymer may take place in the presence or absence of an inert organic solvent. After the reaction mixture becomes homogeneous, the reaction is allowed to continue at the elevated temperature for a period of time sufficient to insure that a quantity of the solubilizing oligomer is formed which is sufficient to dissolve the remainder of any unreacted crosslinking agent. Usually heating for about 20 to 90 minutes, depending on the temperature, is sufficient to insure that enough of the solubilizing oligomer is formed. The homogeneous solution is then cooled to room temperature and may be stored or used immediately. If an insufficient quantity of solubilizing oligomer has been formed, the insoluble crosslinking agent will precipitate upon cooling to form a heterogenous mixture. This problem can be corrected by heating the mixture as indicated above until a sufficient quantity of solubilizing oligomer has been formed.

While crosslinking agents which are insoluble in aprotic solvents are preferred, crosslinking agents which are soluble in aprotic solvents may also be used to prepare the cured bead bond layer. Useful crosslinking agents which are soluble in aprotic solvents include polyols such as polyhydroxy-functional polyesters, acrylates, methacrylates, polyvinylbutyrals or polyvinylformals and polythiols; and polyamines, especially primary amines. Polyamines are not preferred, however, since polyurethanes crosslinked with polyamines exhibit a reduction in shelf-stability and coating life.

Alternatively, other means of crosslinking include a common moisture-cure, whereby ambient moisture interacts with free isocyanate groups to form urea crosslinks. Additionally, the unmasked isocyanate-functional polymer may be crosslinked with di- or polyepoxides to produce thermoset polymers containing 2-oxazolidione crosslinks, as exemplified by U.S. Pat. No. 2,977,369, incorporated herein by reference.

The equivalent ratio of isocyanate group (both blocked and unblocked) to active hydrogen of the crosslinking agent is preferably within the range of about 0.8:1.0 to 2.0:1.0, and is most preferably about 1.0:1.0. All of the crosslinking agent may be added to the masked isocyanate-functional polymer at the time of preparing the homogeneous coating composition. Optionally, only a portion, for example, 2 to 10 percent, need be added at this stage, with the remainder being added to the coating composition at the time of curing.

Polymers which have isocyanate groups incorporated therein may be reacted or crosslinked to a substantially infusible and insoluble state without the addition of multifunctional crosslinking agents. For example, the unblocked isocyanate-functional polymers may be crosslinked through the use of isocyanate-trimerization catalysts to yield isocyanate crosslinks. Isocyanate-trimerization catalysts are described in U.S. Pat. No. 4,136,240, incorporated herein by reference. In this manner the isocyanate-functional polymer acts as a crosslinker for itself.

Regarding topcoat 12 and bead bond layer 14, the compositions comprising these layers preferably contain ultraviolet absorbers and antioxidants to provide them with additional weatherability. Useful ultraviolet absorbers and antioxidants and their concentrations are well-known in the art.

Additionally, well-known flow agents may be used in both the topcoat and bead bond compositions in order to provide coating smoothness. Smooth coatings result in higher reflectance since less light is lost due to scattering.

While preferably the bead bond layer is coated from a 100 percent solids composition, the viscosity of a 100 percent solids composition may be too high for some coating processes. The viscosity of the polymeric bead bond composition may be adjusted by addition of an inert and relatively volatile protic solvent to achieve the appropriate viscosity range for the particular coating process. Such solvents include lower alcohols such as butanol, 2-methoxy ethanol, 2-ethoxy ethanol, and 2-butoxy ethanol. For most coating operations the solvent content need not be greater than about 50 percent by weight and is preferably between about 10 and 40 percent by weight.

To obtain a cured bead bond layer 14 the homogeneous coating composition described hereinabove is applied as a 0.01 to 0.065 mm layer, and is subjected to a standard cure by heating to a temperature which is at least equal to the minimum dissociation temperature for the particular blocking or masking group used. This temperature will normally be betewen about 100° and 160° C. The time required for curing is dependent upon the curing temperature and is normally between about 10 minutes and 16 hours.

While it is preferred in embedded-lens sheeting to employ both a transparent topcoat 12 and a bead bond layer 14, it is appreciated that the topcoat and bead bond layer can be incorporated as one layer of the above-described polymer. Optionally, also, the transparent hard coat 11, topcoat 12 and bead bond layer 14 may be incorporated in a one layer construction. However, such structures result in cured retroreflective sheeting having lower tear strengths than structures which have identical hard coat, topcoat, and bead bond layers.

Microsphere Lenses

Transparent microsphere lenses 13 are glass beads which do not exceed about 200 microns in diameter, and should preferably be between 20 and 120 microns in diameter, most preferably between 60 and 90 microns. The narrower the range of diameters, the more uniform and better the properties of the sheeting. The preferred size distribution from the mean bead diameter should be plus or minus 10 microns. The most preferred size distribution from the mean bead diameter is plus or minus 7.5 microns. For embedded lens type sheeting, the refractive index of the glass beads is preferably between 2.2 and 2.3, most preferably about 2.23.

Chemical treatment of bead surfaces may be utilized as known in the art to enhance resin to glass adhesion. Additionally, fluorocarbon treatment of the glass beads can aid in achieving hemispherical bead sinkage and obtaining uniform bead sinkage, as disclosed in U.S. Pat. No. 3,222,204.

Space Coat

Space coat 15 preferably comprises aminoplast crosslinked resins such as polyvinyl butyral acrylic resins, or polyester resins. A particularly preferred space coat 15 comprises polyvinyl butyral crosslinked with either urea formaldehyde or melamine formaldehyde. The thickness of the space coat 15 will depend on the ratio of the index of refraction of the microspheres to the index of refraction of the hard coat and topcoat, and the diameter of the microspheres. The space coat must be sufficiently thick so as to position the specularly reflective layer 16 at the approximate focal plane for light rays passing thrugh the microspheres. In some cases, through an appropriate combination of high-index microspheres and low index clear coat and topcoat layers, no spacing layer is needed, and a specularly reflective layer may be applied directly to the microspheres. However, a space coat 15 is normally present, and is generally between about 0.005 and 0.020 mm thick.

Reflective Layer

As illustrated in FIG. 1, reflective layer 16 underlies the space coat 15. Suitable underlying reflecting means include uniformly-thick metallic deposits such as silver, aluminum, etc. However, instead of forming the reflective layer from metal, dielectric coatings taught in Bingham, U.S. Pat. No. 3,700,305, can be used. The thickness of reflective layer 16 depends upon the particular metal used and is preferably between about 20 and 100 nm. As an alternative to providing a separate reflective layer 16, specularly reflective pigment may be added to a layer such as the layer 17.

Adhesive Layer

Adhesive layer 17 can be either a pressure sensitive or a heat or solvent-activated adhesive. Preferably, adhesive 17 is a pressure-sensitive acrylic adhesive, between about 0.01 mm and 0.06 mm thick. The adhesive is generally coated from solution on a release-coated paper backing, dried, and then laminated to reflective layer 16. Alternatively, the adhesive may be applied directly to the reflective layer 16 and the release-treated paper backing laminated to the adhesive layer 17, to complete the retroreflective product.

Retroreflective sheeting made according to the method of the present invention reflects most brightly when the topcoat 12, bead bond layer 14, and spacer layer 15 are uncolored and clear, in which case the sheeting will generally have a silver or gray appearance caused by the metallic appearance of the reflective layer 16. However, colored sheeting can be prepared by placing dyes or transparent pigments in the spacer layer 16, bead bond layer 14 or topcoat 12.

METHOD OF PREPARING EMBEDDED LENS SHEETING

One typical procedure for making the embedded-lens structure of FIG. 1 comprises the steps of:
(1) Applying transparent topcoat 12 onto a smooth-surfaced release liner, e.g., by coating, laminating, or spraying;
(2) Applying a layer of the uncured polymeric bead bond composition onto topcoat 12, said bead bond composition comprising a homogeneous coating composition comprising:
   (a) an isocyanate-functional polymeric compound which has a substantial portion of its free isocyanate groups masked by agents or substituents that can be removed by heating; and
   (b) a crosslinking agent for the isocyanate groups, or a catalyst which provides the isocyanate grous with the ability to crosslink with other isocyante groups when heated.
(3) Applying a monolayer of transparent microsphere lenses 13 to the uncured bead bond layer 14;
(4) Softening bead bond layer 14 by heating, generally to a temperature of between 45° and 90° C., while simultaneously aiding resin capillation around the lenses by the application of slight pressure so as to embed the lenses in the softened bead bond layer to between 30 and 40 percent of their diameter;
(5) Thermally setting the bead bonding layer 14 by heating to a temperature which is at least equal to the minimum dissociation temperature for the masking agent that can be removed by heating, for a period of time sufficient to cure said polymeric bead bond layer;

(6) Covering the exposed portions of the microspheres 13 with spacer layer 15 having an exterior surface cupped around the microspheres;

(7) Applying the specularly reflective layer 16 to the cupped surface of the spacer layer 15, typically by vapor-deposition techniques;

(8) Stripping away the smooth-surfaced release liner from the transparent topcoat 12;

(9) Applying, in typical embodiments, the adhesive layer 17 over the specularly reflective layer 16; and

(10) Applying a layer of transparent hard coat 11 over the exposed topcoat left upon removal of the release liner.

Excluding steps 2, 4 and 5 which relate to the particular bead bond layer, the methods of making embedded-lens structures are well-known in the art and are taught by such prior art patents as Palmquist et al., U.S. Pat. No. 2,407,680. Regarding step 4 of the above process, the bead bond layer must be softenable so that the beads may be embedded therein. The softening range for the bead bond of this invention is between the crystalline melting point for the polymer and the minimum dissociation temperature for the blocking or masking agent. As mentioned previously, the minimum dissociation temperature for the masking agent will be between about 90° and 260° C., generally, between about 125° and 140° C. The crystalline melting point for the polymeric bead bond layer is normally between about 45° and 80° C. Thus, generally the bead bond layer is softened by heating to a temperature of between 45° and 90° C.

It is particularly important that packing pressure be applied for example, by a heated pack roller, to aid resin capillation around the microspheres, since the uncured bead bond compositions of the present invention, when heated, crosslink and loose their fluidity and thermoplastic character. Thus, if packing pressure is not applied, the microspheres may not be adhered to the bonding layer in a permanent fashion.

While the above is the typical method of preparing embedded-lens type retroreflective sheeting material, other well-known methods of preparing the sheeting utilizing the particular bead bond compositions of the present invention are also contemplated.

It is preferred that the method of the present invention be used to prepare embedded-lens reflective sheeting since in embedded-lens sheeting the incident light rays are focused onto the specularly reflective layer irrespective of whether the front of the sheeting is wet or dry. However, use could also be made of the bead bond layer of this invention in encapsulated-lens sheeting or in exposed-lens sheeting. In enclosed-lens retroreflective sheeting, as taught by McKenzie, U.S. Pat. No. 3,190,178, the bead bond compositions of the present invention are usefully employed as bonding layers and as cover films. In exposed-lens retroreflective sheeting, as taught by Gebhard et al., U.S. Pat. No. 2,326,634, the bead bond compositions of the present invention are useful as bonding layers.

Additional description of the present invention is provided by the following exemplary preparation of embedded-lens retroreflective sheeting.

EXAMPLE 1

The following example illustrates the improved bead packing and retroreflectivity which can be achieved with the use of the bead bond layers of the present invention. Additionally, this example illustrates the relatively nontacky character of the uncured softened bead bond layer of this invention.

Two types of embedded-lens retroreflective sheeting were prepared, one using an uncured polyurethane coating composition prepared according to the present invention as the bead bond layer 14, and the other utilizing a melamine crosslinked polyester resin of the prior art.

For both types of sheeting a carrier comprised of a paper substrate release coated with a crosslinked acrylic copolymer was coated with an uncured topcoat 12. The topcoat was a homogeneous polyurethane coating composition comprising (a) 60 parts by weight of a polyurethane coating composition prepared according to procedure A described hereinbelow;

(b) 40 parts by weight of a polyurethane coating composition prepared according to procedure B described hereinbelow;

(c) 15 parts by weight of a blocked polyurethane coating composition prepared according to procedure C described hereinbelow; and (d) 23.5 parts of ethylene glycol ether acetate.

Additionally, small amounts of antioxidants, ultraviolet stabilizers, and flow agents were added to the composition, as is well-known in the art.

Procedure A

The isocyanate 4,4'-methylenedicyclohexyl diisocyanate (150 grams, 1.14 equivalents) was combined with 86.0 grams of 2(2-ethoxy)ethoxyethyl acetate and 0.35 grams of dibutyl tin dilaurate in a reaction vessel. Polycaprolactone diol, formula weight 530, commercially available as Niax ® polyol PCP-0200 from Union Carbide (169.0 grams, 0.605 equivalence) was dissolved in 86.0 grams of 2-ethoxy ethyl acetate. The polyol solution was then added to the isocyanate solution under a nitrogen atmosphere with rapid agitation while maintaining the reaction temperature at from about 40° to 45° C. This temperature was maintained until a free isocyanate content (NCO) of 3.5% was achieved. Methylethyl ketoxime (43.2 grams, 0.496 equivalence) was then added to the reaction mixture while maintaining the temperature at from 40° to 45° C. until the isocyanate (NCO) absorption in the infrared spectrum disappeared. Tris(2-hydroxyethyl)isocyanurate (42.3 grams, 0.485 equivalence) was then added to the reaction mixture as a solid powder. The temperature was increased to 115° C. and held at this temperature for 30 minutes. A homogeneous polyurethane coating composition resulted which had a viscosity of 9,400 centipoise, a solids content of 66.4% by weight, and a free isocyanate content of less than 0.1%.

Procedure B

This polyurethane coating composition was prepared according to Procedure A except that the polycaprolactone diol of Procedure A was replaced with the same amount of equivalents of a polycaprolactone diol having a formula weight of 830, commercially available as Niax ® polyol PCP-0210 from Union Carbide.

Procedure C

The isocyanate 4,4'-methylenedicyclohexyl diisocyanate (150 grams, 1.14 equivalents) was combined wtih 86.0 grams of 2(2-ethoxy)ethoxyethyl acetate and 0.35 grams of dibutyl tin dilaurate in a reaction vessel. Polycaprolactone diol, formula weight 530, commercially available as Niax ® polyol PCP-0200 from Union Carbide (160.0 grams, 0.605 equivalence) was dissolved in 86.0 grams of 2-ethoxy ethyl acetate. The polyol solution was then added to the isocyanate solution under a nitrogen atmosphere with rapid agitation while maintaining the reaction temperature at from about 40° to 45° C. This temperature was maintained until a free isocyanate content (NCO) of 3.5% was achieved. Methylethyl ketoxime (43.2 grams, 0.496 equivalence) was then added to the reaction mixture while maintaining the temperature at from 40° to 45° C. until the isocyanate (NCO) absorption in the infrared spectrum disappeared.

This topcoat composition was thermally cured in an oven at about 175° C. for about 10 minutes, to form a 0.05 mm thick topcoat 12.

An uncured bead bond composition was then coated on the cured topcoat 12 at a thickness of 0.025 mm. For the retroreflective sheeting made according to this invention, the bead bond composition comprised the same homogeneous polyurethane coating composition from which the topcoat 12 was formed. The prior art bead bond composition comprised a mixture of an oil-free synthetic polyester resin and a butylated melamine-formaldehyde resin.

The solvent was removed from the polyurethane bead bonding layer by heating it to 150° C. The tack of a sample of this polyurethane bead bonding layer was measured using the "Tack Rolling Ball Method," PSTC-6. The rolling ball distances for five separate trials were between about 200 and 600 cm.

A monolayer of glass beads 13, which were heated to a temperature of 100° C. was applied to sheeting carrying the bead bonding layer. The glass beads had a 75 micrometer mean diameter with a plus or minus 7.5 micrometer distribution, and had been surface treated with an organo-chromium complex to aid bead to resin adhesion, and a fluorocarbon to aid uniform bead sinkage. The glass beads 13 were applied to the bead bond layer by drawing the carrier coated with the bead bond layer through a pan full of the glass beads. The bead coated bead bond layer was then heated to between 80° and 90° C., while pressure was applied by means of a pack roll to embed the beads 13 in the bead bonding layer 14 to between 30 and 40 percent of their diameter. The excess beads were removed by a beater bar which acted on the backside of the carrier after it emerged from the pan. The bead bond layer was subsequently thermally cured by heating to 175° C. for about 10 minutes.

In like manner, the solvent was removed from the uncured polyester/melamine bead bond layer by heating it to 100° C. The tack of a sample of this bead bonding layer was also measured using the "Tack Rolling Ball Method", PSTC-6. The rolling ball distances for five separate trials were between about 25 and 75 cm.

A monolayer of glass beads, which were identical in every respect to those employed with the polyurethane bead bond layer, was applied to the tacky uncured polyester/melamine bead bond layer by drawing the carrier coated with the bead bond layer through a pan full of the glass beads. The excess beads were removed by a beater bar which acted on the backside of the carrier after it emerged from the pan. The polyester/melamine resin capillated around the beads so that they were embedded to between 30–40 pecent of their diameter in the uncured polyester/melamine bead bond layer. The bead bond layer was then cured to a non-tacky state by heating to 150° C.

Next a 25 percent solids resin solution comprised of a polyvinylbutyral resin, and butylated melamine resin, in a solvent was applied to the bead bond layer 14 of each sheeting and cured at 170° C. for about 10 minutes to form a 0.008–0.025 mm thick space coat 15. To the space coat 15 a reflective layer 16 of aluminum metal about 100 nm thick was applied by vapor deposition. The acrylic copolymer-coated carrier was then stripped away. Adhesive layer 17 was then applied to reflective layer 16 by coating a 0.025 mm thick layer of acrylic pressure-sensitive adhesive on a silicone-treated release liner and laminating the adhesive-coated layer to the reflective layer 16 to form the finished embedded-lens retroreflective sheeting.

Bead packing density was determined for each type of sheeting by electron micrographs. The reflectance at angles of 0.2° divergence and 5° incidence were determined with a telephotometer, Model I.C. 2000 from Gamma Scientific Inc. The results of each type of sheeting are reported in Table I below.

TABLE I

| Bead Bonding Layer | Bead Packing | 5° I; 0.2° D Reflectance |
| --- | --- | --- |
| Polyester/Melamine: | 60% | 80–120 Candella/M$^2$ |
| Polyurethane: | 80% | 220–250 Candella/M$^2$ |

Bead packing in Table I is expressed as percent of the theoretical maximum packing for microspheres with diameters of 75±7.5 microns. The increased concentration of microspheres in the sheeting having the polyurethane bead bonding layer of the present invention appear to arise from the fact that the polyurethane resin is nontakcy which allows for repositioning of the glass beads before the bead bond layer is cured and the glass beads are embedded, to allow for more dense packing of beads.

The greater reflectance values achieved with the use of the particular polyurethane bead bond layer is a result of the greater concentration of glass beads contained in the polyurethane bead bond layer which allows a higher percentage of incident light to be focused onto the specularly reflective layer and reflected back toward the original source of the light.

What is claimed is:

1. A method for preparing embedded-lens retroreflective sheeting comprising:
(a) applying a layer of an uncured homogeneous polymeric bead bond composition onto a carrier web, said bead bond composition comprising:
   (1) an isocyanate-functional polymeric compound which has a substantial portion of its free isocyanate groups masked by agents that can be removed by heating; and
   (2) a crosslinking agent;
(b) presenting a mass of transparent microspheres against said layer of uncured bead bond;
(c) heating at least the exterior stratum of said uncured bead bond layer to a temperature sufficient to soften said bead bond layer, but not so high as to thermoset said layer, and applying sufficient pressure to said microspheres to partially embed a dense monolayer of said microspheres in said bead bond layer;

(d) heating said bead bond layer to a temperature and for a period of time sufficient to thermoset said layer;

(e) covering the monolayer of microspheres wtih a layer of transparent binder material having an exterior surface cupped around said microspheres to form a spacing layer; and (f) applying a specularly reflective layer to the cupped surface of the layer of transparent binder material.

2. The method of claim 1 wherein a layer of topcoat material is first applied to said carrier web and is prepared by thermally-curing a composition comprising:

(a) an isocyanate-functional polymeric compound which has a substantial portion of its free isocyanate groups masked by agents that can be removed by heating; and (b) a crosslinking agent.

3. The method of claim 1 wherein said crosslinking agent is selected from the group consisting of crystalline polyols having three or more active hydrogen groups, and said composition additionally comprises (c) an oligomer in which said crosslinking agent and said masked isocyanate-functional polymeric compound are soluble, said oligomer formed by the partial reaction of said crosslinking agent and said unmasked isocyanate-functional polymeric compound.

4. Retroreflective sheeting made according to the method of claim 1.

* * * * *

UNITED STATES PATENT AND TRADEMARK OFFICE
CERTIFICATE OF CORRECTION

PATENT NO. : 4,721,649

DATED : January 26, 1988

INVENTOR(S) : Louis C. Belisle; Thomas R. Borden and Raymond E. Grunzinger, Jr.

It is certified that error appears in the above-identified patent and that said Letters Patent is hereby corrected as shown below:

In Column 1, line 64 "cured" should be --uncured--.

In Column 9, line 46 "isocyanate" should be --isocyanurate--.

In Column 11, line 22 "betewen" should be --between--.

In Column 12, line 56 "grous" should be --groups--.

In Column 14, line 68 "wtih" should be --with--.

In the Claims
In Column 17, line 3 "wtih" should be --with--.

Signed and Sealed this

Nineteenth Day of July, 1988

Attest:

DONALD J. QUIGG

*Attesting Officer*   *Commissioner of Patents and Trademarks*